(12) United States Patent
Han

(10) Patent No.: US 12,487,946 B2
(45) Date of Patent: Dec. 2, 2025

(54) CONNECTION DEVICE BETWEEN DMA AND DRAM USING RE-ORDER BUFFER AND INTERLEAVING AND METHOD OF USING THE SAME

(71) Applicant: Mobilint, Inc., Seoul (KR)

(72) Inventor: Seunghak Han, Seongnam-si (KR)

(73) Assignee: Mobilint, Inc., Seoul (KR)

(\*) Notice: Subject to any disclaimer, the term of this patent is extended or adjusted under 35 U.S.C. 154(b) by 0 days.

(21) Appl. No.: 18/787,649

(22) Filed: Jul. 29, 2024

(65) Prior Publication Data

US 2024/0385973 A1 Nov. 21, 2024

Related U.S. Application Data

(63) Continuation of application No. PCT/KR2022/021349, filed on Dec. 27, 2022.

(30) Foreign Application Priority Data

Dec. 12, 2022 (KR) ................ 10-2022-0172463

(51) Int. Cl.
*G06F 13/16* (2006.01)
*G06F 15/78* (2006.01)
*G06N 3/02* (2006.01)

(52) U.S. Cl.
CPC .............. *G06F 13/16* (2013.01); *G06F 15/78* (2013.01); *G06N 3/02* (2013.01)

(58) Field of Classification Search
None
See application file for complete search history.

(56) References Cited

U.S. PATENT DOCUMENTS 8,886,861 B2  11/2014  Kwon et al.
11,176,438 B2  11/2021  Yang
(Continued)

FOREIGN PATENT DOCUMENTS

CN   114691571 A   7/2022
KR   10-0670820 B1   1/2007
(Continued)

OTHER PUBLICATIONS

International Search Report issued in PCT/KR2022/021349; mailed Aug. 30, 2023.
(Continued)

*Primary Examiner* — Edward J Dudek, Jr.
*Assistant Examiner* — Ralph A Verderamo, III
(74) *Attorney, Agent, or Firm* — Studebaker Brackett PLLC

(57) ABSTRACT

Disclosed is a connection device between a DMA and a DRAM, which includes a slave interface connected to the DMA of an NPU, a master interface connected to the DRAM having a plurality of slave ports, and a switch that connects the slave interface to the master interface, and the connection device receives a data read request from the DMA of the NPU and transfers the received data read request to the DRAM, receives data or a response corresponding to the received data read request from the plurality of slave ports, and rearranges the data or the response based on an order of the received data read request so as to be transferred to the DMA of the NPU.

9 Claims, 6 Drawing Sheets

(56) References Cited

U.S. PATENT DOCUMENTS

| | | | |
|---|---|---|---|
| 2012/0159037 A1 | 6/2012 | Kwon et al. | |
| 2019/0370630 A1 | 12/2019 | Yang | |
| 2021/0192326 A1* | 6/2021 | Park | G06F 9/34 |
| 2021/0256373 A1 | 8/2021 | Ahn et al. | |
| 2022/0382592 A1 | 12/2022 | Zhang et al. | |
| 2023/0004350 A1* | 1/2023 | Li | G06N 3/0464 |
| 2023/0026505 A1* | 1/2023 | Lee | G06F 3/0659 |

FOREIGN PATENT DOCUMENTS

| | | |
|---|---|---|
| KR | 10-2012-0068630 A | 6/2012 |
| KR | 10-2015-0095139 A | 8/2015 |
| KR | 10-2019-0136431 A | 12/2019 |
| KR | 10-2021-0004306 A | 1/2021 |
| KR | 10-2021-0103367 A | 8/2021 |
| KR | 10-2021-0148586 A | 12/2021 |
| KR | 10-2022-0102160 A | 7/2022 |
| KR | 10-2022-0147280 A | 11/2022 |

OTHER PUBLICATIONS

"Notice of Submission of Opinions" Office Action issued in KR 10-2022-0172463; mailed by the Korean Intellectual Property Office on Sep. 10, 2024.

"Written Decision on Registration" Office Action issued in KR 10-2022-0172463; mailed by the Korean Intellectual Property Office on Mar. 5, 2025.

* cited by examiner

CONNECTION DEVICE BETWEEN DMA AND DRAM USING RE-ORDER BUFFER AND INTERLEAVING AND METHOD OF USING THE SAME

CROSS-REFERENCE TO RELATED APPLICATIONS

The present application is a continuation of International Patent Application No. PCT/KR2022/021349, filed on Dec. 27, 2022, which is based upon and claims the benefit of priority to Korean Patent Application No. 10-2022-0172463 filed on Dec. 12, 2022. The disclosures of the above-listed applications are hereby incorporated by reference herein in their entirety.

BACKGROUND

Embodiments of the present disclosure described herein relate to a connection device that efficiently performs reading and writing according to a data request between a DMA of an NPU and a DRAM using a re-order buffer and an interleaving. More particularly, the present disclosure relates to a connection device between a DMA and a DRAM using a re-order buffer and an interleaving, and a method of using the same.

A system on chip (SoC) is emerging as an important issue to speed up data movement by connecting various IPs that make up a chip to DRAMs. In general, processors that control the SoCs have evolved from CPUs to NPUs, and there is an emerging need to control the speed of data reading and data writing according to data requests through the NPUs.

The NPU in the SoC may read data by making a read request to the DRAM before performing neural network operations. Such requests and corresponding responses may be a cause of bottlenecks. In particular, a connector (e.g., a connection device) located between the DMA and the DRAM, which may cause the bottlenecks, plays a key role in terms of data transfer speed.

SUMMARY

Embodiments of the present disclosure provide to decrease the bottleneck phenomenon by reducing a data transfer speed related to data reading and/or data writing between a DMA of an NPU and a DRAM.

In addition, embodiments of the present disclosure provide to decrease the bottleneck phenomenon that occurs in the process of performing a neural network operation after reading all data in the DRAM when a read request from the DRAM through the NPU is performed.

The problems to be solved by the present disclosure are not limited to the problems mentioned above, and other problems not mentioned may be clearly understood by those skilled in the art from the description below.

According to an embodiment of the present disclosure, a connection device includes a slave interface connected to a DMA of an NPU, a master interface connected to a DRAM having a plurality of slave ports, and a switch that connects the slave interface to the master interface, and the connection device receives a data read request from the DMA of the NPU and transfers the received data read request to the DRAM, receives data or a response corresponding to the received data read request from the plurality of slave ports, and rearranges the data or the response based on an order of the received data read request so as to be transferred to the DMA of the NPU.

According to an embodiment of the present disclosure, a data transfer scheduling method includes receiving a data read request from a DMA of an NPU and transferring the received request to a DRAM having a plurality of slave ports, receiving data or a response corresponding to the received request from the plurality of slave ports, and rearranging the data or the response based on an order of the request so as to be transferred to the DMA of the NPU, and storing data returned from the plurality of slave ports depending on the request through a re-order buffer.

In addition, a computer program stored in a computer-readable recording medium for execution to implement the present disclosure may be further provided.

In addition, a computer-readable recording medium recording a computer program for executing a method for implementing the present disclosure may be further provided.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
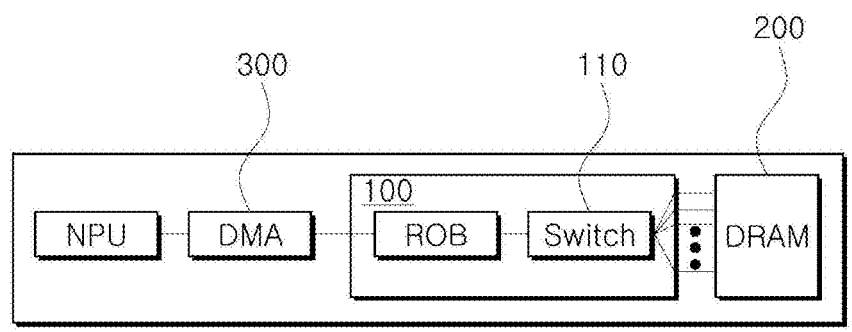
FIG. 1 is a schematic block diagram of an SoC including a connection device, according to various embodiments of the present disclosure.

The same reference numerals refer to the same elements throughout the specification. In the present disclosure, all elements of embodiments are not described, and general contents in the technical field to which the present disclosure pertains or repeated contents between the embodiments will not be described. In the specification, terms such as "parts", "modules", "members", and "blocks" may be implemented by using software or hardware. In some embodiments, a plurality of parts, modules, members, or blocks are implemented with a single element, or one part, module, member, or block may include a plurality of elements.

Throughout the specification, when a part is referred to as being "connected" to another part, it includes "directly connected" and "indirectly connected," and the "indirectly connected" includes "connected through a wireless communication network."

In addition, when a part "includes" an element, another element may be further included, rather than excluding the existence of another element, unless otherwise described.

Throughout the specification, when a member is described as being located "on" another member, this includes not only cases where the member is in contact with another member, but also cases where another member exists between the two members.

Terms "first", "second", and the like are used herein to distinguish one element from another element, and the elements are not limited to the terms described above.

As used herein, singular forms "a" and "an" are intended to include plural forms as well, unless the context clearly indicates otherwise.

Reference numerals in operations are used for the sake of convenience of description and do not describe an order of the operations, and the operations may be performed through an order different from the described order unless the context clearly indicates a specific order.

Hereinafter, a principle of action and embodiments of the present disclosure will be described with reference to the accompanying drawings.

In this specification, an 'apparatus according to the present disclosure' includes all various apparatuses that may perform computational processing and may provide results to a user. For example, the apparatus according to the present disclosure may include all of a computer, a server apparatus, and a portable terminal, or may take the form of any one of them.

In this case, the computer may include, for example, a notebook computer, a desktop, a laptop, a tablet PC, a slate PC, etc., which are equipped with a web browser.

The server apparatus is a server that processes information by communicating with an external apparatus, and may include an application server, computing server, database server, file server, game server, mail server, proxy server, web server, etc.

The portable terminal is, for example, a wireless communication device that guarantees portability and mobility, and may include all types of handheld-based wireless communication devices such as a PCS (Personal Communication System), GSM (Global System for Mobile communications), a PDC (Personal Digital Cellular), a PHS (Personal Handyphone System), a PDA (Personal Digital Assistant), an IMT (International Mobile Telecommunication)-2000, a CDMA (Code Division Multiple Access)-2000, a W-CDMA (W-Code Division Multiple Access), a WiBro (Wireless Broadband Internet) terminal, and a smart phone, and wearable devices such as watches, rings, bracelets, anklets, necklaces, glasses, contact lenses, or head-mounted-device (HMD).

A neural processing unit (NPU) according to various embodiments of the present disclosure performs neural network operations. The NPU may refer to a processor specialized to perform operations for artificial neural networks.

The artificial neural network according to various embodiments of the present disclosure is a network that multiplies and adds individual weights according to various input values, and may additionally transform and transfer a value with an added deviation using an activation function. A trained artificial neural network may output inference results from input values.

The NPU according to an embodiment may include a semiconductor device implemented as an electronic circuit. The electronic circuit is a circuit that includes, for example, transistors, capacitors, etc. The NPU may include an internal memory, a scheduler, and an interface.

According to an embodiment, the NPU may read data stored in DRAM and/or Lx SRAM into an internal memory through an NPU interface. The NPU scheduler may control the operation of the processing element array for the inference operation of the NPU and a reading order and/or a writing order of the internal memory.

The NPU interface according to an embodiment may exchange data with components within an edge device through a system bus. For example, the NPU may read the data of the artificial neural network model stored in a memory into the internal memory of the NPU through the NPU interface.

The NPU scheduler according to an embodiment accesses the memory and utilizes necessary data. The NPU scheduler may generate data locality information or information on structure based on node data, weight data, etc. The node data may refer to a feature map, and the weight data may refer to a weight tunnel.

According to an embodiment, the NPU scheduler may schedule the operation order of the artificial neural network model. For example, the NPU scheduler may set the order of reading and writing data in the artificial neural network model according to a specific criteria. An example of this may be the order of prioritizing large-sized data, which may have a slow data processing speed. The NPU scheduler may set the order of processing based on information associated with data locality or structure of the artificial neural network model.

The connection device according to various embodiments of the present disclosure may refer to a connection device located between the DMA and the DRAM and connecting the DMA to the DRAM. The connection device may sequentially read data from a plurality of slave ports of the DRAM through memory interleaving. Additionally, the connection device may rearrange the order of data read from the DRAM through a memory interleaving according to the read request order and may transfer the data to the DMA.

The memory interleaving according to an embodiment refers to a method of splitting and accessing the memory simultaneously to minimize access time according to a request to read the data to the memory. For example, the connection device of the present disclosure may perform a data read process using the memory interleaving using a plurality of ports of the master interface and a plurality of slate ports of the DRAM corresponding to each port of the master interface. There are no restrictions on pipelines or access methods utilizing the memory interleaving.

FIG. 1 is a schematic block diagram of an SoC including a connection device, according to various embodiments of the present disclosure.

Referring to FIG. 1, before a neural network operation is performed, the NPU reads quickly input data, weight data, and instruction data required for the operation from a DRAM 200 through a DMA 300. Afterwards, the NPU may be set to write the operation result in the DRAM 200. As the read and write times of such operation processing processes become longer, latency may increase due to a bottleneck section in which data is transferred from the DMA 300 to the DRAM 200 even if the operation processing speed of the NPU is fast.

According to an embodiment, the SoC may include the NPU, a connection device 100, the DRAM 200, and the DMA 300. Due to the operation processing characteristics of the NPU, the operation begins after reading all data from the DRAM 200, so the design purpose of the connection device 100 of the present disclosure may be to reduce the bottleneck phenomenon from the DRAM 200 to the DMA 300. The connection device 100 uses a re-order buffer (ROB) and a memory interleaving to solve the bottleneck phenomenon.

According to an embodiment, the connection device 100 may be a device that connects the DMA 300 to the DRAM 200. The connection device 100 includes a switch 110 and a re-order buffer.

The connection device 100 according to an embodiment may include a slave interface connected to the DMA 300, a master interface connected to the DRAM 200, and the switch 110 connecting the slave interface to the master interface. In this case, the DMA 300 is connected to the NPU. Additionally, the DRAM 200 has a plurality of slave ports.

Figure 2:
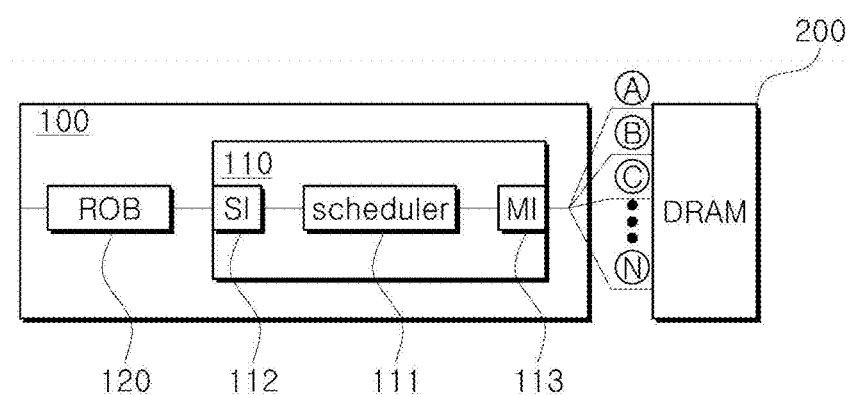
FIG. 2 is an internal block diagram of a connection device, according to various embodiments of the present disclosure.

FIG. 2 is an internal block diagram of a connection device, according to various embodiments of the present disclosure.

Referring to FIG. 2, the connection device 100 according to the present disclosure includes the switch 110 and a re-order buffer 120. In this case, the switch 110 may include a scheduler 111, a slave interface 112, and a master interface 113.

The connection device 100 according to an embodiment is a device that connects the DMA (e.g., the DMA 300 in FIG. 1) to the DRAM (e.g., the DRAM 200 in FIG. 1). The connection device 100 connects the slave interface 112 to the DMA and connects the master interface to the DRAM.

The connection device 100 according to an embodiment includes the switch 110 and the re-order buffer 120. In this case, the number of master ports of the switch 110 is the same as the number of ports of the DRAM.

According to an embodiment, the connection device 100 receives a data read command from the DMA and assigns an ID through the re-order buffer 120. In this case, the connection device 100 sequentially reads data until all data that needs to be read from each DRAM port are read using the memory interleaving. Due to the nature of the NPU, data of the DRAM should be entered sequentially, but the connection device 100 schedules data to be continuously received from all ports of the DRAM through the memory interleaving, so the order needs to be rearranged.

The re-order buffer 120 according to an embodiment refers to queue-type hardware required for in-order completion. In detail, the re-order buffer 120 maintains the order in which instructions are fetched.

According to an embodiment, the re-order buffer 120 rearranges the order of all data read through the memory interleaving and sends the rearranged data to the DMA. In this case, the order of data may be rearranged by the switch 110. The connection device 100 may also be used when performing a neural network operation using input values, weight data, and instruction data read through DMA and writing the operation result in the DRAM.

According to an embodiment, when writing the operation result of the NPU in the DRAM through the DMA, an ID is assigned from the re-order buffer 120 of the connection device 100 and the operation result may be quickly written in the DRAM through the memory interleaving.

The connection device 100 according to an embodiment may assign the ID to each port of the master interface 113 through the switch 110. Each port of the master interface 113 corresponds one-to-one with each slave port of the DRAM 200, and their numbers may be matched.

The memory may store data supporting various functions of the connection device 100 and a program for the operation of the NPU, may store input/output data, and may store a plurality of application programs (application programs or applications) running on the device, data and commands for operation of the connection device 100.

The memory may include a storage medium that is implemented with at least one type of a flash memory, a hard disk, a solid state disk (SSD), a silicon disk drive (SDD), a multimedia card micro memory, a card-type memory (e.g., an SD memory or an XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and optical disk. Additionally, the memory may be a database that is separate from the device, but is connected wired or wirelessly.

At least one component may be added or deleted in correspondence with the performance of the components illustrated in FIG. 2. Also, it should be easily understood by one skilled in the art that mutual locations of components may be changed depending on the performance or the structure of system.

Meanwhile, each component illustrated in FIG. 2 refers to software and/or hardware components such as a Field Programmable Gate Array (FPGA) and an Application Specific Integrated Circuit (ASIC).

Figure 3:
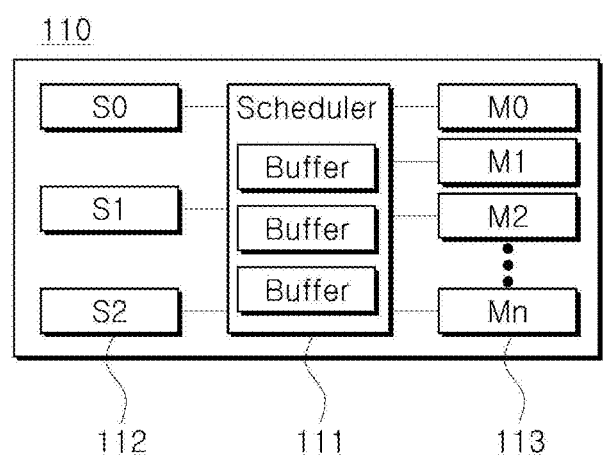
FIG. 3 an internal block diagram of a switch, according to various embodiments of the present disclosure.

FIG. 3 an internal block diagram of a switch, according to various embodiments of the present disclosure.

Referring to FIG. 3, the switch 110 includes the scheduler 111, the slave interface 112, and the master interface 113. Components that the switch 110 may include are not limited thereto.

The connection device according to an embodiment may assign the ID to each port of the master interface 113 through the switch 110. Each port of the master interface 113 corresponds one-to-one with a slave port of the DRAM (e.g., the DRAM 200 in FIG. 1), and their numbers may be matched. That is, the number of ports of the master interface 113 may be the same as the number of ports of the DRAM. Referring to FIG. 3, the switch 110 may assign the IDs of M0, M1, M2, and Mn to the master interface 113. The IDs of M0 to Mn may correspond to ports A to N of the DRAM 200 in FIG. 2, respectively, and the switch 110 may read data from the DRAM through the memory interleaving, using the scheduler 111 and the re-order buffer. Afterwards, the switch 110 may identify the transfer order of the read data depending on a data size, a data reading order, a data request frequency, etc. The switch 110 may rearrange the data according to the data transfer order and may transfer the data to the DMA through the slave interface 112.

The connection device according to an embodiment identifies multi-core operating conditions of the NPU based on the instruction data through the scheduler 111. The scheduler 111 may regenerate input values, weights, convolutions, depthwise convolutions, instruction data, etc. corresponding to the multi-core in the buffer of the scheduler 111 and may distribute the regenerated result to the slave interface 112.

The connection device according to an embodiment may include the re-order buffer that stores data returned from a plurality of slave ports in response to a request for the DRAM.

The scheduler 111 according to an embodiment includes at least one buffer. The buffer may temporarily store data when the scheduler 111 performs scheduling of reading and/or writing data through data transfer scheduling logic.

The scheduler 111 according to an embodiment may read instruction data required for scheduling through ports of the DRAM. The scheduler 111 may identify the multi-core operating conditions of the NPU through the instruction data.

The scheduler 111 according to an embodiment may regenerate inputs, weights, convolutions, depthwise convolutions, and instruction data corresponding to each NPU cores in a buffer so as to be distributed. Accordingly, the scheduler 111 may utilize the SoC to read and write data at an optimal speed.

Figure 4:
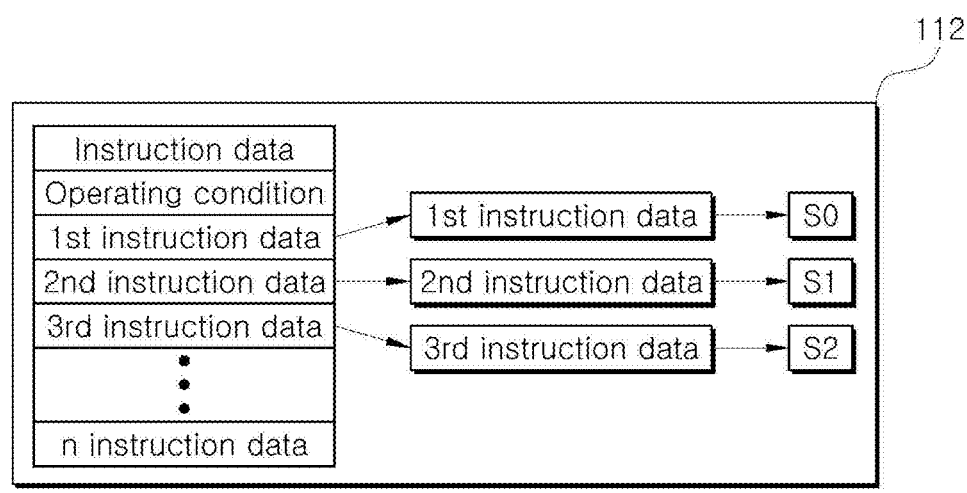
FIG. 4 is a data read block diagram of data scheduling, according to various embodiments of the present disclosure.

FIG. 4 is a data read block diagram of data scheduling, according to various embodiments of the present disclosure.

Referring to FIG. 4, the scheduler may read instruction data into the master interface of the switch through a port A of the DRAM and may transfer the instruction data to the slave interface of the switch. In this case, the scheduler rearranges the order of reading and/or writing data using the memory interleaving such that the instruction data may be transferred most efficiently.

The scheduler according to an embodiment may set data transfer between the master interface and the slave interface to reduce the bottleneck phenomenon when reading necessary data from the DRAM through various instruction data. For example, the scheduler may store data corresponding to frequent requests through the re-order buffer, then may rearrange the data in the order read through the master interface, and may schedule the rearranged data to be distributed to the multi-core of the NPU.

Figure 5:
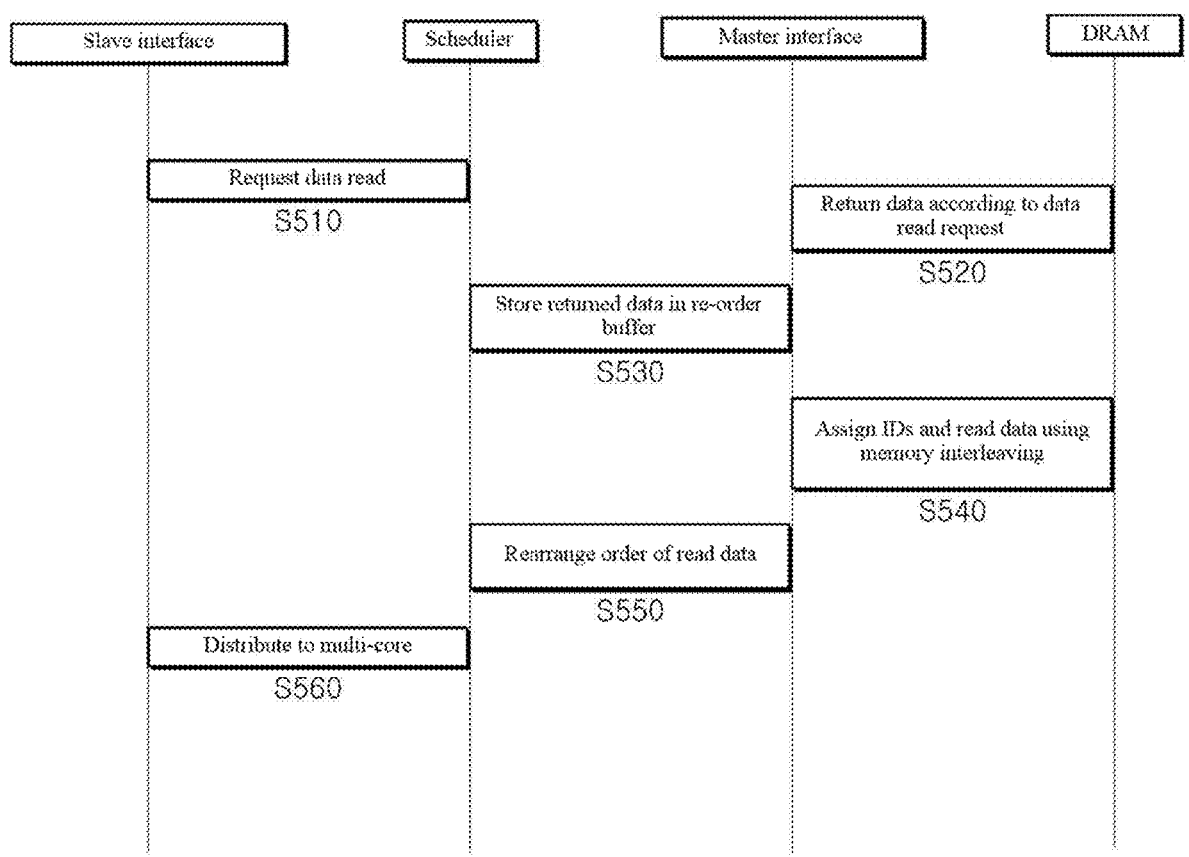
FIG. 5 is a flowchart illustrating an operation of a connection device during a read operation, according to various embodiments of the present disclosure.

FIG. 5 is a flowchart illustrating an operation of a connection device during a read operation, according to various embodiments of the present disclosure.

The connection device according to various embodiments may receive a data read request from the DMA of the NPU and transfer the data read request to the DRAM, may receive data or a response corresponding to the received request from a plurality of slave ports, and may rearrange the data or the response based on the order of the requests so as to be transferred to the DMA of the NPU.

Referring to FIG. 5, the scheduler of the connection device receives a data read request from the slave interface (S510). The scheduler returns data from a plurality of slave ports of the DRAM according to the data read request, and in this case, the return is performed by the master interface (S520).

According to an embodiment, the connection device includes a re-order buffer that stores returned data. The scheduler stores the returned data in the re-order buffer (S530). The scheduler assigns the IDs through the re-order buffer and sequentially reads data from the plurality of slave ports of the DRAM according to a request order using the memory interleaving (S540).

According to an embodiment, the scheduler rearranges the order of data read from the DRAM through the memory interleaving (S550). In this case, the scheduler sequentially transfers the rearranged data to the DMA of the NPU so as to be distributed to the multi-core (S560).

According to an embodiment, the switch of the connection device may read the instruction data required for scheduling of the scheduler from a first port among a plurality of slave ports. In this case, the function of scheduling to read from the first port may be performed by the scheduler. In this case, the first port may refer to the port A that is to be read from the DRAM first depending on the order of read requests through the ID assignment and the memory interleaving. In detail, the order may be rearranged sequentially starting from the port of the DRAM that is to be read first.

Figure 6:
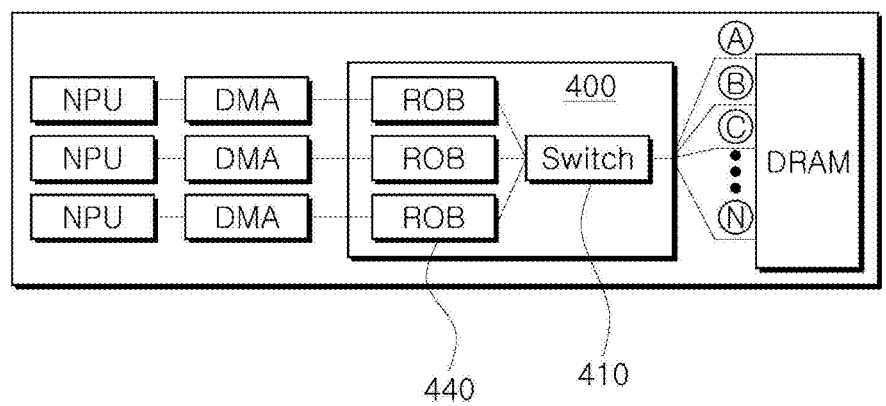
FIG. 6 is a schematic block diagram of an SoC including a connection device connected to a plurality of NPUs, according to various embodiments of the present disclosure.

FIG. 6 is a schematic block diagram of an SoC including a connection device connected to a plurality of NPUs, according to various embodiments of the present disclosure.

Referring to FIG. 6, a connection device 400 may include a switch 410 and a re-order buffer 440. The SoC of FIG. 6 may include a plurality of NPUs, the connection device 400, and a DRAM.

The connection device 400 according to an embodiment includes a slave interface connected to a plurality of DMAs of a plurality of NPUs, a master interface connected to a DRAM having a plurality of slave ports, and a scheduler that controls data movement between the plurality of NPUs and the DRAM. The connection device 400 controls operations of a plurality of NPUs using the scheduler, and distributes data of the DRAM to the plurality of DMAs of the plurality of NPUs through the scheduler.

Meanwhile, the disclosed embodiments may be implemented as a recording medium storing instructions executable by a computer. The instructions may be stored in the form of a program code, and may generate, when executed by a processor, a program module such that operations of the disclosed embodiments may be performed. The recording medium may be implemented as a computer-readable recording medium.

The computer-readable recording medium includes all kinds of recording media in which instructions capable of being interpreted by the computer are stored. For example, the computer-readable recording medium may include a read only memory (ROM), a random access memory (RAM), a magnetic tape, a magnetic disc, a flash memory, an optical data storage device, etc.

According to an embodiment of the present disclosure, the connection device between the DMA and the DRAM may increase the operation processing speed of the processor that makes up the SoC.

According to an embodiment of the present disclosure, the connection device may increase the operation processing speed of the entire SoC by processing read requests given to the DRAM through the memory interleaving and rearranging the order of request processing using the re-order buffer.

The effects of the present disclosure are not limited to the aforementioned effects, and other effects not mentioned herein will be clearly understood from the above description by those skilled in the art to which the present disclosure pertains.

As described above, the disclosed embodiments have been described with reference to the accompanying drawings. Those skilled in the art to which the present disclosure pertains will be understood that the present disclosure may be implemented in a form different from the disclosed embodiments without changing the technical spirit or essential features of the present disclosure. The disclosed embodiments are illustrative and should not be construed as limiting.

What is claimed is:

1. A connection device between a Direct Memory Access (DMA) and a Dynamic Random Access Memory (DRAM) comprising:
   a slave interface connected to the DMA of a Neural Processing Unit (NPU);
   a master interface connected to the DRAM having a plurality of slave ports; and
   a switch configured to connect the slave interface to the master interface, and
   wherein the connection device receives a data read request from the DMA of the NPU and transfers the received data read request to the DRAM, receives data or a response corresponding to the received data read request from the plurality of slave ports, and rearranges the data or the response based on an order of the received data read request so as to be transferred to the DMA of the NPU,
wherein the switch includes a scheduler configured to read instruction data required for scheduling from a first port among the plurality of slave ports, and
wherein the scheduler identifies operating conditions of a multi-core of the NPU through the instruction data, and reproduces and distributes input values, weights, convolutions, depthwise convolutions, and instruction data corresponding to the multi-core in a buffer.

2. The connection device between the DMA and the DRAM of claim 1, further comprising:
a re-order buffer (ROB) configured to store data returned from the plurality of slave ports depending on the request.

3. The connection device between the DMA and the DRAM of claim 1, wherein the number of ports of the master interface matches the number of ports of the plurality of slave interfaces.

4. The connection device between the DMA and the DRAM of claim 2, wherein the connection device assigns an identification (ID) through the re-order buffer and sequentially reads the returned data from the plurality of slave ports of the DRAM using a memory interleaving.

5. The connection device between the DMA and the DRAM of claim 2, wherein the connection device rearranges an order of the returned data read from the DRAM using a memory interleaving so as to be transferred to the DMA of the NPU.

6. The connection device between the DMA and the DRAM of claim 2, wherein the connection device performs a neural network operation using input values, weight data, and instruction data read through the DMA of the NPU, and transfers a result of the performed operation to the DRAM based on an identification (ID) assigned from a re-order buffer, using a memory interleaving.

7. A connection device between a plurality of Direct Memory Accesses (DMAs) and a Dynamic Random Access Memory (DRAM) comprising:
a slave interface connected to the plurality of DMAs of a plurality of Neural Processing Units (NPUs);
a master interface connected to the DRAM having a plurality of slave ports; and
a scheduler configured to control data movement between the plurality of NPUs and the DRAM, and
wherein operations of the plurality of NPUs are controlled by the scheduler, and the data of the DRAM is distributed to the plurality of DMAs of the plurality of NPUs through the scheduler,
wherein the scheduler reads instruction data required for scheduling from a first port among the plurality of slave ports, identifies operating conditions of a multi-core of an NPU through the instruction data, and reproduces and distributes input values, weights, convolutions, depthwise convolutions, and instruction data corresponding to the multi-core in a buffer.

8. A data transfer scheduling method which is performed by a device, the data transfer scheduling method comprising:
receiving a data read request from a Direct Memory Access (DMA) of a Neural Processing Unit (NPU) and transferring the received request to a Dynamic Random Access Memory (DRAM) having a plurality of slave ports;
receiving data or a response corresponding to the received request from the plurality of slave ports, and rearranging the data or the response based on an order of the request so as to be transferred to the DMA of the NPU; and
storing data returned from the plurality of slave ports depending on the request through a re-order buffer,
wherein instruction data required for scheduling of a scheduler is read through a first port among the plurality of slave ports,
wherein the scheduler identifies operating conditions of a multi-core of the NPU through the instruction data, and reproduces and distributes input values, weights, convolutions, depthwise convolutions, and instruction data corresponding to the multi-core in a buffer.

9. A non-transitory computer-readable storage medium that stores a computer program, when executed by one or more processors, performs following operations for performing a data transfer scheduling method, the operations including:
receiving a data read request from a Direct Memory Access (DMA) of a Neural Processing Unit (NPU) and transferring the received request to a Dynamic Random Access Memory (DRAM) having a plurality of slave ports;
receiving data or a response corresponding to the received request from the plurality of slave ports, and rearranging the data or the response based on an order of the request so as to be transferred to the DMA of the NPU; and
storing data returned from the plurality of slave ports depending on the request through a re-order buffer,
wherein instruction data required for scheduling of a scheduler is read through a first port among the plurality of slave ports,
wherein the scheduler identifies operating conditions of a multi-core of the NPU through the instruction data, and reproduces and distributes input values, weights, convolutions, depthwise convolutions, and instruction data corresponding to the multi-core in a buffer.

* * * * *